United States Patent [19]
Endo et al.

[11] 4,287,164
[45] Sep. 1, 1981

[54] PROCESS FOR PRODUCING CUBIC SYSTEM BORON NITRIDE

[75] Inventors: Tadashi Endo; Osamu Fukunaga, both of Sakura; Minoru Iwata, Matsudo, all of Japan

[73] Assignee: National Institute for Researches in Inorganic Materials, Ibaraki, Japan

[21] Appl. No.: 84,162

[22] Filed: Oct. 12, 1979

[30] Foreign Application Priority Data

Oct. 23, 1978 [JP] Japan .................................. 53-130292

[51] Int. Cl.$^3$ .......................................... C01B 21/064
[52] U.S. Cl. .................................................... 423/290
[58] Field of Search .......................................... 423/290

[56] References Cited

U.S. PATENT DOCUMENTS

2,947,617  8/1960  Wentorf ............................... 423/290

FOREIGN PATENT DOCUMENTS

52-39599  3/1977  Japan ..................................... 423/290

OTHER PUBLICATIONS

Devries, R. C. et al., "Journ. of Crys. Growth", 1972, pp. 88–92.

Primary Examiner—G. O. Peters
Attorney, Agent, or Firm—Oblon, Fisher, Spivak, McClelland & Maier

[57] ABSTRACT

A process for producing cubic system boron nitride comprises contacting calcium or strontium boron nitride with hexagonal system boron nitride and heating at higher than 1,450° C. under the thermodynamically stable pressure for cubic system boron nitride.

7 Claims, 4 Drawing Figures

PROCESS FOR PRODUCING CUBIC SYSTEM BORON NITRIDE

BACKGROUND OF THE INVENTION

1. Field of the Invention

The present invention relates to a process for producing cubic system boron nitride. More particularly, it relates to a process for producing a cubic system boron nitride having high strength and high purity by converting hexagonal system boron nitride into cubic system boron nitride with calcium or strontium boron nitride which dissolves boron nitride.

2. Description of the Prior Arts

The cubic system boron nitride is a highly hard crystal having diamond like characteristics whose thermal and chemical characteristics are superior to those of diamond. Accordingly, the cubic system boron nitride has been considered to be important as an abrasive for quenched steel.

Heretofore, the cubic system boron nitride has been produced by converting hexagonal system boron nitride with a catalyst such as Ia, IIa or IIIa group element in the periodic table; and their nitrides, lead, tin, antimony; aluminum alloy e.g. Al-Fe, Al-Ni, Al-Co, Al-Si, Al-Mn or Al-Cr; urea or ammonium salts. However, when said metal catalyst is used as the catalyst, unstable borides and free boron are formed as by-products and the contamination of the cubic system boron nitride crystal with boron is found and the crystal is black and has relatively low strength.

When the metal nitride is used as the catalyst, the unreacted nitride remained in the lattice of the cubic system boron nitride and the cubic system boron nitride having high purity can not be obtained.

When urea or the ammonium salt is used, the resulting crystal has remarkably small as a particle diameter of 0.1 to 0.5 μm.

SUMMARY OF THE INVENTION

It is an object of the present invention to overcome the disadvantages in the conventional method and to provide a process for producing cubic system boron nitride having high strength and high purity.

The foregoing and other objects of the present invention have been attained by providing a process for producing a cubic system boron nitride by heating calcium or strontium boron nitride with hexagonal boron nitride at higher than 1,450° C. under the thermodynamically stable pressure for cubic system boron nitride.

DETAILED DESCRIPTION OF THE PREFERRED EMBODIMENTS

Figure 1:
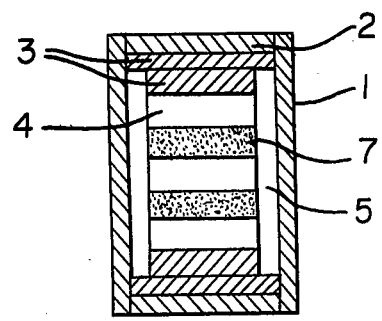
FIGS. 1, 2 and 3 show steps of the process of the present invention wherein
(1) graphite heating element;
(2) graphite disk;
(3) sodium chloride disk;
(4) hexagonal system boron nitride disk or plug;
(5) hexagonal system boron nitride cylinder or container;
(6) cubic system boron nitride;
(7) calcium boron nitride
(8) calcined pyrophyllite disl;
(9) calcined pyrophyllite cylinder;
(10) tool steel disk (quenched hardness $H_{Rc}$-60)
(11) alumina disk;
(12) molybdenum or tantalum container.

The mechanism for conversion of hexagonal system boron nitride into cubic system boron nitride with the catalyst in the conventional process has not been known. It has been considered that the solution phase containing the catalyst may have a function for dissolving boron nitride at least during the conversion of crystalline structure and the crystal growth. Thus, it is considered that a state including a liquid phase is formed in the chemical system for converting hexagonal system boron nitride into cubic system boron nitride. However, it is not considered that the liquid phase of the catalytic metal of the alkali or alkaline earth metal such as Li, Mg, Ca and Sr directly affects to the conversion of hexagonal system boron nitride into cubic system boron nitride, because the cubic system boron nitride is obtained only at a temperature remarkably higher than the melting point of the metal under the pressure required for forming the cubic system boron nitride. Thus, it is considered that the phase for dissolving boron nitride is not a simple molten metal but a molten complex of the metal and boron nitride which has a melting point higher than the melting point of the metal. The molten complex may dissolve boron nitride.

The inventors have studied to prepare a complex of calcium boron nitride ($Ca_3B_2N_4$) and to heat the complex with hexagonal system boron nitride at higher than 1,450° C. under the thermodynamically stable pressure for cubic system boron nitride. As a result, cubic system boron nitride having high strength and high purity has been obtained without forming various by-products in the reaction system. The present invention has been attained by such findings.

The calcium boron nitrides ($Ca_3B_2N_4$) used in the present invention can be obtained by mixing metallic calcium or calcium hydride with hexagonal system boron nitride at a molar ratio of Ca to B of 3:2 and heating the mixture in an atmosphere of nitrogen, nitrogen-hydrogen or ammonia at 800° to 950° C. for longer than 12 hours and at 900° to 1,050° C. for longer than 20 hours.

The composition of calcium boron nitride may be varied in some extent. The ratios of 3:2:4 of Ca:B:N may be varied to $3\pm X:2\pm Y:4\pm Z$ wherein X, Y and Z respectively may be 0 to about 0.2. The strontium boron nitrides can be also produced by the similar method.

The resulting calcium boron nitride is mixed with hexagonal system boron nitride or excess of hexagonal system boron nitride is incorporated in the production of calcium boron nitride to remain excess hexagonal system boron nitride.

It is preferable to incorporate more than 10 wt.% of hexagonal system boron nitride to $Ca_3B_2N_4$.

The cubic system boron nitride can be obtained by heating the mixture of hexagonal system boron nitride and calcium boron nitride at higher than 1,450° C. preferably 1,450° to 2,000° C. under the thermodynamically stable pressure for cubic system boron nitride such as from about 40 to 100 k. bar, preferably from about 50 to 60 k. bar. (See FIG. 4).

Figure 4:
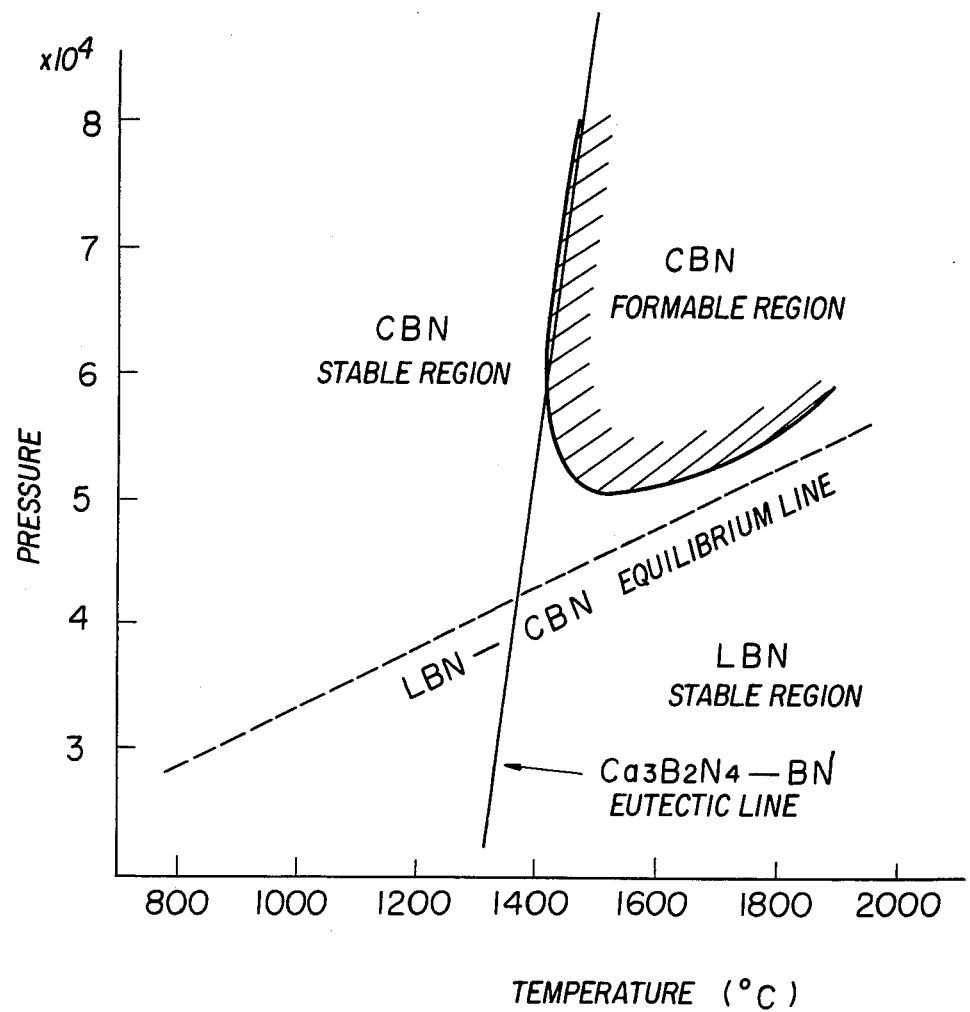
FIG. 4 shows the relation of the temperature and the pressure for forming cubic system boron nitride.

FIG. 4 shows the relation of the temperature and the pressure for producing cubic system boron nitride.

The minimum temperature in the range for producing cubic system boron nitride with the catalyst of calcium is 1,450° C. Cubic system boron nitride can not be obtained at a temperature lower than 1,450° C.

The starting material of hexagonal system boron nitride is preferably a pure compound having a content of oxygen component of less than 2 to 3 wt.%.

Thus, a pure hexagonal system boron nitride is preferably heated in an atmosphere of nitrogen of 1 atm. at lower than 2,000° C. to decrease the content of oxygen component as the pretreatment.

Figure 2:
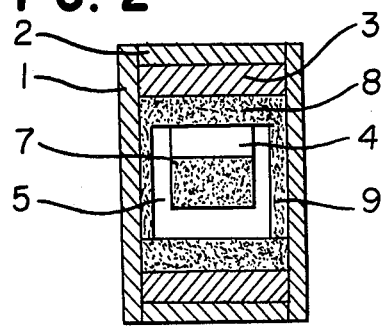
Figure 3:
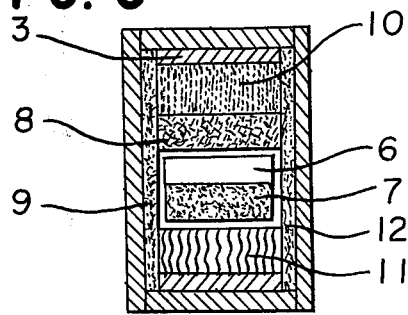

The examples of constitution of the sample assembly in a high pressure cell were shown in FIGS. 1, 2 and 3. The constitution is not limited to these examples. In the embodiments of FIG. 1, the number of the layers can be increased and in the embodiments of FIGS. 1, 2 and 3, the shapes and the sizes of the sample assembly may be varied according to kinds of high pressure cells.

In the preferable embodiments, hexagonal system boron nitride or a mixture of hexagonal system boron nitride and calcium or strontium boron nitride (1 to 90 wt.% preferably 50 wt.% of calcium or strontium boron nitride) is molded in a form of a plate or the other shape especially a disk which preferably has a thickness of 0.5 mm to 10 mm.

The molded plate or other product is usually brought into contact with calcium or strontium boron nitride and packed as a sample assembly in a high pressure cell and heated at higher than 1,450° C. under the thermodynamically stable pressure for cubic system boron nitride whereby cubic system boron nitride is formed at their contact parts. After the treatment, the unreacted hexagonal system boron nitride and calcium or strontium boron nitride are dissolved with an acid. In the case of the mixture of hexagonal system boron nitride and calcium or strontium boron nitride, a particle size of hexagonal system boron nitride is preferably in a range of 0.1 μm to 10 μm. The mixture is also preferably molded in a desired form and packed as a sample assembly in a high pressure cell and heated under the same pressure and the unreacted materials are dissolved with an acid.

The particle size of the resulting cubic system boron nitride can be increased by packing the resulting cubic system boron nitride and calcium or strontium nitride in a high pressure cell and heating them at higher than 1,450° C. under the high pressure. The sample assembly can be held between suitable disks. In accordance with this treatment, the cubic system boron nitride is melted into a molten calcium or strontium boron nitride and crystallized as large cubic system boron nitride.

The present invention will be further illustrated by certain examples which are provided for purposes of illustration only and are not intended to be limiting the present invention.

EXAMPLE 1

The apparatus shown in FIG. 1 was used. In FIG. 1, the reference numeral (1) designates a graphite heating element; (2) designates a graphite disk; (3) designates a sodium chloride disk for maintaining the uniformity of the pressure in the reaction chamber; (4) designates hexagonal system boron nitride disk or plug; and (5) designates a hexagonal system boron nitride cylinder or container. $Ca_3B_2N_4$ powder was pressed by a tabletting machine under a pressure of 2.0 to 4.5 k. bar. to form disks and the $Ca_3B_2N_4$ disks and the hexagonal system boron nitride disks were alternately piled in the container. The container was heated by a belt type high temperature high pressure furnace at 1,500° C. under the pressure of 56 k. bar. for about 40 minutes.

The power supply was stopped to quench the container and then, the pressure was gradually released and the resulting crystals were taken out.

The crystals were tested by the X-rays diffractometry, the scratching test for a super hard alloy, and the microscope observation to confirm cubic system boron nitride.

The unreacted materials in the reaction product were dissolved in hydrochloric acid and a mixture of hydrochloric acid and nitric acid and the product was separated by the gravity separation with heavy liquid to obtain cubic system boron nitride crystals having transparent pale yellow color and a diameter of about 200 μm and octahedron or twin crystalline form.

The pressure in the example was measured by the phase transition points of bismuth, thallium and barium at room temperature of 25.5, 37 and 55 k. bar. respectively. The temperature was measured by Pt-Pt 13% Rh thermocouple. The high pressure high temperature apparatus should be maintained at the operation temperature and pressure for the time required for the reaction though it is not limited to the apparatus shown in FIG. 1.

EXAMPLE 2

In accordance with the process of Example 1 except varying the condition to the pressure of 60 k. bar., the temperature of 1,750° C. and the time of about 60 minutes the reaction was carried out to obtain crystals. A large crystal of cubic system boron nitride (about 120–130 μm) and transparent pale yellow color tetrahedron predominant configuration. On the other hand, a small crystal of cubic system boron nitride (less than about 50 μm) was a colorless and transparent crystal.

EXAMPLE 3

In a hexagonal system boron nitride container (5) shown in FIG. 2, a press-molded $Ca_3B_2N_4$ (7) was charged and a hexagonal system boron nitride plug (4) was placed to form the closed container. The container was inserted into a calcined pyrophyllite cylinder (9) which was prepared by calcining at 900° C. for longer than 10 hours and each pyrophyllite disk (8) was placed at the upper and lower parts. The pyrophyllite disk can be substituted by a disk made of talc, silica glass, or sodium chloride. Thus, the container was heated at 1,450° C. under the pressure of 60 k. bar. for 30 minutes to obtain cubic system boron nitride crystals as the process of Example 1.

Most of the crystals had a diameter of less than 50–60 μm and were colorless and transparent crystals. The yield was about 60%.

EXAMPLE 4

As shown in FIG. 3, fine cubic system boron nitride powder (6) and $Ca_3B_2N_4$ powder (7) were charged in the metallic cylinder made of molybdenum or tantalum (12). A calcined pyrophyllite disk (8) and quenched steel disk (10) (Rockwell hardness (C) 60) were placed at the upper part and an alumina disk (11) was placed at the lower part and they were inserted into a calcined pyrophyllite cylinder (9). Each sodium chloride disk (3) was placed at the upper and lower parts as the plugs for the cylinder (9). The quenched steel (10) was used to minimize the deformation of the graphite furnace under the pressure. The alumina disk (11) was used so as to give temperature gradient for the furnace sinc alumina has excellent heat conductivity. The similar effect can be given by preventing heat production of the lower graphite plug (2) by increasing the thickness of the graphite plug (2).

In accordance with the process of Example 1, the apparatus was heated at 1,500° C. under the pressure of 55 k. bar. for 90 minutes to obtain crystals of cubic system boron nitride.

The crystals had a diameter of more than 10 μm to about 50-60 μm and were pale yellow or colorless and transparent.

The recrystallization of cubic system boron nitride can be carried out by such temperature gradient method (caused in the graphite furnace). This example illustrates a method of increasing a size of cubic system boron nitride.

EXAMPLE 5

In accordance with the process of Example 1 except using strontium boron nitride instead of calcium boron nitride, cubic system boron nitride was produced. The result was substantially similar to that of Example 1.

We claim:

1. A process for producing cubic system boron nitride which comprises contacting calcium or strontium boron nitride with hexagonal system boron nitride and heating at higher than 1,450° C. under the thermodynamically stable pressure for cubic system boron nitride.

2. A process according to claim 1 wherein the thermodynamically stable pressure for cubic system is ranging from 40 to 100 k. bar.

3. A process according to claim 1 wherein the conversion from hexagonal system boron nitride into cubic system boron nitride is carried out in a furnace at a temperature ranging from 1,450° to 2,000° C.

4. A process according to claim 1 or 3 wherein the conversion is carried out in a container made of hexagonal system boron nitride.

5. A process according to claim 1 or 3 wherein the conversion is carried out in a container made of a calcined pyrophyllite.

6. A process according to claim 1 wherein a disk or a plug made of alumina, pyrophyllite, sodium chloride is used for forming a container.

7. A process according to claim 1 wherein calcium boron nitride is $Ca_3B_2N_4$ and strontium boron nitride is $Sr_3B_2N_4$.

* * * * *